US008825560B2

(12) United States Patent
Hodjat et al.

(10) Patent No.: US 8,825,560 B2
(45) Date of Patent: Sep. 2, 2014

(54) DISTRIBUTED EVOLUTIONARY ALGORITHM FOR ASSET MANAGEMENT AND TRADING

(71) Applicant: Genetic Finance (Barbados) Limited, Belleville (BB)

(72) Inventors: Babak Hodjat, Dublin, CA (US); Hormoz Shahrzad, Dublin, CA (US); Antoine Blondeau, Hong Kong (CN); Adam Cheyer, Oakland, CA (US); Peter Harrigan, San Francisco, CA (US)

(73) Assignee: Genetic Finance (Barbados) Limited, Belleville (BB)

( * ) Notice: Subject to any disclaimer, the term of this patent is extended or adjusted under 35 U.S.C. 154(b) by 0 days.

(21) Appl. No.: 13/895,238

(22) Filed: May 15, 2013

(65) Prior Publication Data

US 2013/0254142 A1 Sep. 26, 2013

Related U.S. Application Data

(60) Division of application No. 12/769,589, filed on Apr. 28, 2010, now Pat. No. 8,527,433, and a continuation-in-part of application No. 12/267,287, filed on Nov. 7, 2008.

(60) Provisional application No. 61/173,580, filed on Apr. 28, 2009, provisional application No. 60/986,533, filed on Nov. 8, 2007, provisional application No. 61/075,722, filed on Jun. 25, 2008.

(51) Int. Cl.
*G06F 15/00* (2006.01)
*G06Q 10/00* (2012.01)
*G06N 3/08* (2006.01)
*G06N 3/12* (2006.01)

(52) U.S. Cl.
CPC .............. *G06N 3/086* (2013.01); *G06N 3/126* (2013.01)
USPC ................................ 706/10; 706/12; 705/1.1

(58) Field of Classification Search
CPC .............................. G06N 3/086; G06N 3/126
USPC ...................................................... 706/10, 12
See application file for complete search history.

(56) References Cited

U.S. PATENT DOCUMENTS

| 5,761,381 A | 6/1998 | Arci et al. |
| 5,845,266 A | 12/1998 | Lupien et al. |

(Continued)

FOREIGN PATENT DOCUMENTS

| EP | 0762294 A2 | 3/1997 |
| EP | 2422276 A1 | 2/2012 |

(Continued)

OTHER PUBLICATIONS

Dec. 23, 2008 International Search Report and Written Opinion for PCT/US2008/82876, 10 pp.

(Continued)

*Primary Examiner* — Alan Chen
(74) *Attorney, Agent, or Firm* — Haynes Beffel & Wolfeld LLP; Warren S. Wolfeld

(57) ABSTRACT

A server computer and a multitude of client computers form a network computing system that is scalable and adapted to continue to evaluate the performance characteristics of a number of genes generated using a software application running on the client computers. Each client computer continues to periodically receive data associated with the genes stored in its memory. Using this data, the client computers evaluate the performance characteristic of their genes by comparing a solution provided by the gene with the periodically received data associated with that gene. Accordingly, the performance characteristic of each gene may be updated and varied with each periodically received data. The performance characteristic of a gene defines its fitness. The genes may be virtual asset traders that recommend trading options, and the data associated with the genes may be historical trading data.

10 Claims, 3 Drawing Sheets

(56) References Cited

U.S. PATENT DOCUMENTS

| | | | |
|---|---|---|---|
| 5,920,848 | A | 7/1999 | Schutzer et al. |
| 6,240,399 | B1 | 5/2001 | Frank et al. |
| 6,249,783 | B1 | 6/2001 | Crone et al. |
| 7,013,344 | B2 | 3/2006 | Megiddo |
| 7,246,075 | B1 | 7/2007 | Testa |
| 7,370,013 | B1 | 5/2008 | Aziz et al. |
| 7,444,309 | B2 | 10/2008 | Branke et al. |
| 8,639,545 | B2 | 1/2014 | Cases et al. |
| 2002/0019844 | A1 | 2/2002 | Kurowski et al. |
| 2004/0210545 | A1 | 10/2004 | Branke et al. |
| 2004/0254901 | A1 | 12/2004 | Bonabeau et al. |
| 2005/0033672 | A1 | 2/2005 | Lasry et al. |
| 2005/0187848 | A1 | 8/2005 | Bonissone et al. |
| 2005/0198103 | A1 | 9/2005 | Ching |
| 2007/0143198 | A1 | 6/2007 | Brandes et al. |
| 2007/0143759 | A1 | 6/2007 | Ozgur et al. |
| 2007/0185990 | A1 | 8/2007 | Ono et al. |
| 2008/0071588 | A1 | 3/2008 | Eder |
| 2008/0228644 | A1 | 9/2008 | Birkestrand et al. |
| 2009/0125370 | A1 | 5/2009 | Blondeau et al. |
| 2009/0327178 | A1* | 12/2009 | Jacobson ................ 706/13 |
| 2010/0030720 | A1 | 2/2010 | Stephens |
| 2010/0182935 | A1 | 7/2010 | David |
| 2010/0256795 | A1 | 10/2010 | McLaughlin et al. |
| 2010/0257228 | A1 | 10/2010 | Staggs et al. |
| 2010/0257605 | A1 | 10/2010 | Mclaughlin et al. |
| 2010/0274742 | A1 | 10/2010 | Hodjat et al. |
| 2012/0239592 | A1 | 9/2012 | Esbensen |

FOREIGN PATENT DOCUMENTS

| | | |
|---|---|---|
| EP | 2422278 A1 | 2/2012 |
| JP | 08-110804 A | 4/1996 |
| JP | 2001325041 A | 11/2001 |
| JP | 2003044665 A | 2/2003 |
| JP | 2004240671 A | 8/2004 |
| JP | 2004302741 A | 10/2004 |
| JP | 2007207173 A | 8/2007 |
| JP | 2007522547 A | 8/2007 |
| WO | 2005073854 A2 | 8/2005 |
| WO | 2010120440 A2 | 10/2010 |

OTHER PUBLICATIONS

Koza, J.R., "Genetic Programming: On the Programming of Computers by Means of Natural Selection", Dec. 1992, MIT Press, pp. 1-609.

Nov. 26, 2012 Extended EP SR for EP 08847214, 9 pp.

Streichert F., "Introduction to Evolutionary Algorithms," paper to be presented Apr. 4, 2002 at the Frankfurt MathFinance Workshop Mar. 30, 2002, Frankfurt, Germany, XP55038571, 22 pp. (retrieved from the Internet: URL:http://www.ra.cs.uni-tuebingen.de/mitarb/streiche/publications/Introduction to E volutionary Algorithms. pdf).

Jun. 16, 2011 Written Opinion from Singapore Patent Office in related application SG 201003127-6, 9 pp.

Apr. 20, 2012 Exam Report for related application AU 2008323758, 2 pp.

JP 2010-533295, Office Action dated Apr. 16, 2013, 12 pages.

Jun. 22, 2011 Office Action in U.S. Appl. No. 12/267,287, 16 pp.

Jul. 27, 2012 Final Office Action in U.S. Appl. No. 12/267,287, 14 pp.

Sakauchi et al., Unifine: A Next Generation Financial Solution System of Nihon Unisys Ltd., Technology Review 'UNISYS,' Japan, Nihon Unisys Ltd., Feb. 28, 2006, vol. 25, No. 4, pp. 14-15.

AU 2010241594, Examination Report dated Oct. 8, 2013, 3 pages.

Aug. 1, 2012 Office Action in U.S. Appl. No. 13/443,546, 10 pp.

International Search Report mailed Jun. 29, 2010 in PCT/US10/32841.

M.R. Akbarzadeh-T. et al., "Friendship Modeling for Cooperative Co-Evolutionary Fuzzy Systems: A Hybrid GA-GP Algorithm," Proc. 22nd Int'l Conf. of N. American FIPS, 2003, pp. 61-66.

J.E. Bartlett II, et al., "Organizational Research: Determining Appropriate Sample Size in Survey Research," IT, Learning, and Performance Journal 19(1) 2001, 8 pages.

J.C. Bongard, et al., "Guarding Against Premature Convergence while Accelerating Evolutionary Search," Proc. 12th annual cont. of Genetic and evolutionary computation, 2010, 8 pages.

M. Davarynejad, "Fuzzy Fitness Granulation in Evolutionary Algorithms for complex optimization," Master of Science Thesis, Ferdowsi Univ. of Mashhad, 2007, 30 pages.

M. Davarynejad et al., "A Novel General Framework for Evolutionary Optimization: Adaptive Fuzzy Fitness Granulation," CEC 2007, 6 pages.

E. Ducheyne et al., "Is Fitness Inheritance Useful for Real-World Applications?" Evolutionary Multi-Criterion Optimization, ser. LNCS 2631, 2003, pp. 31-42.

J.M. Fitzpatrick et al., "Genetic Algorithms in Noisy Environments," Machine Learning 3: pp. 101-120, 1988.

A. Gaspar-Cunha et al., "A Multi-Objective Evolutionary Algorithm Using Neural Networks to Approximate Fitness Evaluations," Int'l J. Computers, Systems and Signals, 6(1) 2005, pp. 18-36.

P.S. Georgilakis, "Genetic Algorithm Model for Profit Maximization of Generating Companies in Deregulated Electricity Markets," Applied Artificial Intelligence, 2009, 23:6, pp. 538-552.

G. Gopalakrishnan et al., "Optimal Sampling in a Noisy Genetic Algorithm for Risk-Based Remediation Design," Bridging the gap: meeting the world's water and environmental resources challenges, Proc. World Water Congress 2001, 8 pages.

H. Juille, "Evolution of Non-Deterministic Incremental Algorithms as a New Approach for Search in State Spaces," Proc. 6th Int'l Conf. on Genetic Algorithms, 1995, 8 pages.

A. Kosorukoff, "Using incremental evaluation and adaptive choice of operators in a genetic algorithm," Proc. Genetic and Evolutionary Computation Conference, GECCO-2002, 7 pages.

Myers, Raymond H. and Montgomery, Douglas C., Response Surface Methodology: Process and Product Optimization Using Designed Experiments, John Wiley and Sons, Inc., New York, 1995, 12 pages.

A. Nelson, "Fitness functions in evolutionary robotics: A survey and analysis," Robotics and Autonomous Systems 57 (2009) pp. 345-370.

S. Remde, et al. "Evolution of Fitness Functions to Improve Heuristic Performance," LION 2007 II, LNCS 5313 pp. 206-219.

J. Sacks, et al. "Design and Analysis of Computer Experiments," Statistical Science 4:4, 1989, pp. 409-435.

M. Salami, et al., "A fast evaluation strategy for evolutionary algorithms," Applied Soft Computing 2/3F (2003), pp. 156-173.

J. Torresen, "A Dynamic Fitness Function Applied to Improve the Generalisation when Evolving a Signal Processing Hardware Architecture," Proc. EvoWorkshops 2002, 267-299 (12 pages).

B.A. Whitehead, "Genetic Evolution of Radial Basis Function Coverage Using Orthogonal Niches," IEEE Transactions on Neural Networks, 7:6, (1996) pp. 1525-1528.

A.S. Wu et al. "An incremental fitness function for partitioning parallel tasks," Proc. Genetic and Evolutionary Computation Conf. (2001) 8 pages.

Enee, Gilles et al., "Classifier Systems Evolving Multi-Agent System with Distributed Elitism," Proc. 1999 Congress on Evolutionary Computation (CEC'99) vol. 3:6, Jul. 1999, pp. 1740-1746.

Tanev I et al., "Scalable architecture for parallel distributed implementation of genetic programming on network of workstations," J. Systems Architecture, vol. 47, Jul. 2001, pp. 557-572.

Streichert F., "Introduction to Evolutionary Algorithms," paper to be presented Apr. 4, 2002 at the Frankfurt MathFinance Workshop Mar. 30, 2002, Frankfurt, Germany, XP55038571, 22 pages (retrieved from the Internet: URL:http://www.ra.cs.uni-tuebingen.de/mitarb/streiche/publications/Introduction to E volutionary Algorithms. pdf).

Poli R. et al., "Genetic Programming: An introductory Tutorial and a Survey of Techniques and Applications," Univ. Essex School of Computer Science and Electronic Engineering Technical Report No. CES-475, Oct. 2007, 112 pages.

Oct. 12, 2009 Supplementary European Search Report for EP 10 77 0287, 11 pages.

(56) References Cited

OTHER PUBLICATIONS

Schoreels C., "Agent based Genetic Algorithm Employing Financial Technical Analysis for Making Trading Decisions Using Historical Equity Market Data," IEEE/WIC/ACM International Conference on Intelligent Agent Technology (IAT2004), Beijing, China, 2004, pp. 421-424.

International Search Report mailed Jul. 2, 2010 in PCT/US10/32847.

López Jaimes A. et al., "MRMOGA: Parallel evolutionary multiobjective optimization using multiple resolutions," Proc. IEEE Congress on Evolutionary Computation, vol. 3, Sep. 2005, pp. 2294-2301.

Castillo Tapia M.G. et al., "Applications of multi-objective evolutionary algorithms in economics and finance: A survey," Proc. IEEE Congress on Evolutionary Computation, Sep. 2007, pp. 532-539.

Bui L.T. et al., "Local models: An approach to distributed multi-objective optimization," Computational Optimization and Applications, vol. 42, No. 1, Oct. 2007, pp. 105-139.

León C. et al., "Parallel hypervolume-guided hyperheuristic for adapting the multi-objective evolutionary island model," Proc. 3rd Int'l Workshop on Nature Inspired Cooperative Strategies for Optimization Studies in Computational Intelligence, vol. 236, Nov. 2008, pp. 261-272.

Oct. 12, 2012 Extended Search Report for EP 10 77 0288 12 pages.

Oct. 9, 2012 Supplementary European Search Report for EP 10770287 10 pages.

AU 2010241597—Examination Report dated Nov. 4, 2013, 4 pages.

U.S. Appl. No. 12/769,605—Notice of Allowance dated Mar. 11, 2014, 14 pages.

\* cited by examiner

DISTRIBUTED EVOLUTIONARY ALGORITHM FOR ASSET MANAGEMENT AND TRADING

CROSS-REFERENCES TO RELATED APPLICATIONS

This application is a divisional application of U.S. application Ser. No. 12/769,589, filed Apr. 28, 2010, entitled "DISTRIBUTED EVOLUTIONARY ALGORITHM FOR ASSET MANAGEMENT AND TRADING", which claims the benefit under 35 USC 119(e) of U.S. Provisional Application No. 61/173,580, filed Apr. 28, 2009, entitled "DISTRIBUTED EVOLUTIONARY ALGORITHM FOR STOCK TRADING", which applications are both incorporated herein by reference in their entirety.

This application is also a Continuation-in-Part of U.S. application Ser. No. 12/267,287, filed Nov. 7, 2008, entitled "DISTRIBUTED NETWORK FOR PERFORMING COMPLEX ALGORITHMS," (GNFN 2110-1), which application claims benefit under 35 USC 119(e) of U.S. Provisional Application No. 60/986,533, filed Nov. 8, 2007, entitled "DISTRIBUTED NETWORK FOR PERFORMING COMPLEX ALGORITHMS" (GNFN 2100-0), and U.S. Provisional Application No. 61/075,722, filed Jun. 25, 2008, entitled "DISTRIBUTED NETWORK FOR PERFORMING COMPLEX ALGORITHMS" (GNFN 2300-0).

BACKGROUND OF THE INVENTION

Complex financial trend and pattern analysis processing is conventionally done by supercomputers, mainframes or powerful workstations and PCs, typically located within a firm's firewall and owned and operated by the firm's Information Technology (IT) group. The investment in this hardware and in the software to run it is significant. So is the cost of maintaining (repairs, fixes, patches) and operating (electricity, securing data centers) this infrastructure.

Stock price movements are generally unpredictable but occasionally exhibit predictable patterns. Genetic Algorithms (GA) are known to have been used in stock categorization. According to one theory, at any given time, 5% of stocks follow a trend. Genetic algorithms are thus sometimes used, with some success, to categorize a stock as following or not following a trend.

Evolutionary algorithms, which are supersets of Genetic Algorithms, are good at traversing chaotic search spaces. As has been shown by Koza, J. R., "Genetic Programming: On the Programming of Computers by Means of Natural Selection", 1992, MIT Press, an evolutionary algorithm can be used to evolve complete programs in declarative notation. The basic elements of an evolutionary algorithm are an environment, a model for a gene, a fitness function, and a reproduction function. An environment may be a model of any problem statement. A gene may be defined by a set of rules governing its behavior within the environment. A rule is a list of conditions followed by an action to be performed in the environment. A fitness function may be defined by the degree to which an evolving rule set is successfully negotiating the environment. A fitness function is thus used for evaluating the fitness of each gene in the environment. A reproduction function generates new genes by mixing rules with the fittest of the parent genes. In each generation, a new population of genes is created.

At the start of the evolutionary process, genes constituting the initial population are created entirely randomly, by putting together the building blocks, or alphabets, that form a gene. In genetic programming, the alphabets are a set of conditions and actions making up rules governing the behavior of the gene within the environment. Once a population is established, it is evaluated using the fitness function. Genes with the highest fitness are then used to create the next generation in a process called reproduction. Through reproduction, rules of parent genes are mixed, and sometimes mutated (i.e., a random change is made in a rule) to create a new rule set. This new rule set is then assigned to a child gene that will be a member of the new generation. In some incarnations, the fittest members of the previous generation, called elitists, are also copied over to the next generation.

BRIEF SUMMARY OF THE INVENTION

A networked computer system, in accordance with one embodiment of the present invention, includes one or more sever computers and a multitude of client computers that are in communication with the server computer. Each client computer includes, in part, a memory, a communication port, and a processor. The memory in each client computer is operative to store a multitude genes each gene characterized by a set of conditions and at least one action. The communication port in each client computer continues to periodically receive data associated with the genes stored in the memory. The processor in each client computer evaluates the performance characteristic of each of its genes by comparing a solution provided by that gene with the periodically received data associated with that gene. Accordingly, the performance characteristic of each gene is updated and varied with each periodically received data. The performance characteristic of a gene defines its fitness. In one embodiment, the data associated with each gene is historical trading data and the solution provided by each gene is a trade recommended by the gene.

In one embodiment, genes whose fitness are determined as falling below a first predefined threshold value following an evaluation covering a first time period are discarded. The remaining (surviving) genes continue to be evaluated by their client computers as new data is received on a periodic basis.

In one embodiment, genes that survive the first evaluation time period continue to be evaluated by the client computers for one or more additional time periods in response to instructions from the server computer. During each additional evaluation period, genes whose fitness fall below a threshold value are discarded. Genes that survive the one or more evaluation periods, as requested by the server, are stored in an elitist gene pool for selection by the server. The threshold values used to evaluate a gene's fitness corresponding to multiple time periods may or may not be equal.

In one embodiment, the server computer selects genes from the clients computers' elitist pool and stores them in its memory. The server may send the genes stored in its memory back to one or more of the selected client computers for further evaluation covering additional time periods. The selected client computers perform further evaluation of the genes for the additional time periods and attempt to send the surviving genes back to the server. Genes that are discarded by the client computers are reported to the server. In one embodiment, the server only receives genes whose fitness as determined by the client computers are equal to or greater than the fitness of the genes previously stored by the server.

In one embodiment, genes initially evaluated by the client computers are generated in accordance with computer instructions stored and executed by the client computers. In one embodiment, the server stores a fixed number of genes in its memory at any given time. The server, after accepting a new gene from a client computer, combines the fitness value of the accepted gene with a corresponding fitness value the server has previously stored in the server for that gene.

A method of solving a computational problem, in accordance with one embodiment of the present invention, includes in part, storing N genes each characterized by a set of conditions and at least one action; continuing to periodically receive data associated with the N genes; and evaluating performance characteristic of each gene by comparing a solution provided by the gene with the periodically received data associated with that gene. Accordingly, the performance characteristic of each gene is updated and varied with each periodically received data. The performance characteristic of a gene defines its fitness. In one embodiment, the data associated with each gene is historical trading data and the solution provided by each gene is a trade recommended by the gene.

In one embodiment, genes whose fitness are determined as falling below a first predefined threshold value following an evaluation covering a first time period spanning P days are discarded. The remaining genes that survive the evaluation continue to be evaluated as new data are received on a periodic basis.

In one embodiment, genes that survive the first evaluation time period continue to be evaluated for one or more additional time periods in response to instructions. During each additional evaluation period, genes whose fitness fall below a threshold value are discarded. Genes that survive the one or more evaluation periods are stored in an elitist gene pool for possible selection. The selected genes are stored in a different memory. The threshold values used to evaluate a gene's fitness corresponding to multiple time periods may or may not be equal.

In one embodiment, selected genes may be sent back for further evaluation covering additional time periods. The selected genes are further evaluated for the additional time periods. Genes that survive this further evaluation are provided for selection. Genes that do not survive the further evaluation are discarded but noted in a report. In one embodiment, only genes whose fitness is determined as being equal to or greater than the fitness of previously stored genes are selected.

In one embodiment, the genes are generated in accordance with computer instructions stored and executed by a client computer. In one embodiment, a fixed number of selected genes are stored at any given time by a computer supervising and sending instructions to the client computers. In one embodiment, the fitness value of a newly selected gene is combined with a corresponding fitness value of the gene if that gene was it was previously selected and stored.

DETAILED DESCRIPTION OF THE INVENTION

In accordance with one embodiment of the present invention, a server computer and a multitude of client computers form a network computing system that is scalable and is adapted to continue to evaluate the performance characteristics of a number of genes generated using a software application running on the client computers. In one embodiment, the genes are virtual asset traders that recommend trading options.

In the following description it is understood that (i) a system refers to a hardware system, a software system, or a combined hardware/software system; (ii) a network computing system refers to a multitude of mobile or stationary computer systems that are in communication with one another either wirelessly or using wired lines; a network computing system includes, in part, a multitude of computers at least one of which is a central or distributed server computer, with the remaining computers being client computers; each server or client computer includes at least one CPU and a memory.

Figure 1:
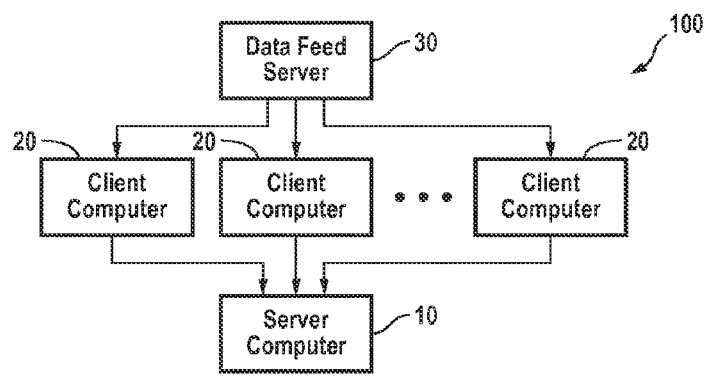
FIG. 1 is an exemplary high-level block diagram of a network computing system configured to execute an evolutionary algorithm, in accordance with one embodiment of the present invention.

FIG. 1 is an exemplary high-level block diagram of a network computing system 100, in accordance with one embodiment of the present invention. Network computing system 100 is shown as including, in part, N client computers 20 and one server computer 10. It is understood that server 10 may be a central or a distributed server. A client computer may be a laptop computer, a desktop computer, a cellular/VoIP handheld communication/computation device, a table computer, or the like.

A broadband connection connects the client computers (alternatively referred to herein as client) 20 to sever computer (alternatively referred to herein as server) 10. Such connection may be cable, DSL, WiFi, 3G wireless, 4G wireless or any other existing or future wireline or wireless standard that is developed to connect a CPU to the Internet. Any CPU may be used if a client software, in accordance with the present invention and as described further below, is enabled to run on that CPU.

In one embodiment, network computing system 100 implements financial algorithms/analysis and computes trading policies. To achieve this, the computational task associated with the algorithms/analysis is divided into a multitude of sub-tasks each of which is assigned and delegated to a different one of the clients. The computation results achieved by the clients are thereafter collected and combined by server 10 to arrive at a solution for the task at hand. The sub-task received by each client may include an associated algorithm or computational code, data to be implemented by the algorithm, and one or more problems/questions to be solved using the associated algorithm and data. Accordingly, in some examples, server 10 receives and combines the partial solutions supplied by the CPU(s) disposed in the clients to generate a solution for the requested computational problem. When the computational task being processed by network computing system 10 involves financial algorithms, the final result achieved by integration of the partial solutions supplied by the clients may involve a recommendation on trading of one or more assets. In other examples, the tasks performed by the clients are independent from one another. Accordingly, in such embodiments, the results achieved by the clients are not combined with one another, although the sever pools the results it receives from clients to advance the solution. Although the following description is provided with reference to making recommendations for trading of financial assets (e.g., stocks, indices, currencies, etc.) using genes, it is understood that the embodiments of the present invention are equally applicable to finding solutions to any other computational problem, as described further below.

Scaling of the evolutionary algorithm may be done in two dimensions, namely by the pool size and/or evaluation. In an evolutionary algorithm, the larger the pool or population of the genes, the greater is the diversity of the genes. Consequently, the likelihood of finding fitter genes increases with increases in pool size. In order to achieve this, the gene pool may be distributed over many clients. Each client evaluates its pool of genes and sends the fittest genes to the server, as described further below.

Each client that is connected to the network, in accordance with the present invention, receives or downloads a client software. The client software automatically generates a multitude of genes whose number may vary depending on the memory size and the CPU processing power of the client. For example, in one embodiment, a may have 1000 genes for evaluation.

A gene is assumed to be a virtual trader that is given a hypothetical sum of money to trade using historical data. Such trades are performed in accordance with a set of rules that define the gene thereby prompting it to buy, sell, hold its position, or exit its position. A rule is a list of conditions followed by an action, which may be, for example, buy, sell, exit or hold. Rules may also be designed to contain gain-goal and stop-loss targets, thus rendering the exit action redundant. A hold occurs when no rule in the gene is triggered, therefore, the gene effectively holds its current position. A condition is a conjunction list of indicator based conditions. Indicators are the system inputs that can be fed to a condition, such as tick, or the closing price. Indicators could also be introspective to indicate the fitness of the gene at any given moment.

The following code defines a gene in terms of conditions and indicators, as well as the action taken by the gene, in accordance with one exemplary embodiment of the present invention:

```
if (PositionProfit >= 2% and !(tick= (−54/10000)% prev tick and
MACD is negative)
and !(tick= (−119/10000)% prev tick and Position is long ))
and !(ADX × 100 <= 5052))
then SELL
``` where "and" represents logical "AND" operation, "!" represents logical "NOT" operation, "tick", "MACD" and "ADX" are stock indicators, "SELL" represents action to sell, and "PositionProfit" represents the profit position of the gene.

Genes are evaluated over stock-days. A stock-day is a day worth of historical data for a specific stock. At a specific interval in a given stock-day, for example, every 5 minutes, rules of a gene are evaluated by assigning the current values of the indicators into the conditions of each rule. If none of the conditions of a gene are true for the indicator values, the gene holds its previous position. If the gene had no position, it performs no action. A gene may be designed to take the action of its first rule whose conditions are satisfied. If, for example, the rule's action is a sell, then the trade proposed by the gene is taken to be a sell. In another example, a rule that fires with the exit action may trump all other votes and force an exit from the gene's current position.

In accordance with one embodiment of the present invention, a gene's fitness or success is determined by approximation and using a large amount of data. The model used to evaluate the genes may thus be partial and cover shorter time spans, while improving in accuracy as the genes are evaluated over more stock-days and gain experience. To establish an initial approximation for the genes' fitness, as described further below, the genes' fitness are first evaluated over a subset of the available data. The time period over which a gene's fitness has been evaluated is referred to herein as the gene's maturity age, also referred to herein as the gene's age. Genes that reach a predefined age are enabled to reproduce and contribute to the next generation of genes. Each such genes can continue to live and stay in the gene pool as long as its cumulative fitness meets predefined conditions.

The historical data used to evaluate a gene's fitness is significant. Therefore, even with today's high processing power and large memory capacity computers, achieving quality results within a reasonable time is often not feasible on a single machine. A large gene pool also requires a large memory and high processing power. In accordance with one embodiment of the present invention, scaling is used to achieve high quality evaluation results within a reasonable time period. The scaling operation is carried out in two dimensions, namely in pool size as well as in evaluation of the same gene to generate a more diverse gene pool so as to increase the probability of finding fitter genes. Therefore, in accordance with one embodiment of the present invention, the gene pool is distributed over a multitude of clients for evaluation. Each client continues to evaluate its gene pool using historical data that that the client periodically receives on a sustained and continuing basis. In other words, a gene's performance (also referred to herein as the genes' fitness) continues to be evaluated over additional historical data that are received periodically and on a continuing basis by the clients. Genes that satisfy one or more predefined conditions are transmitted to the server.

In accordance with another embodiment of the present invention, gene distribution is also used to increase the speed of evaluation of the same gene. To achieve this, genes that are received by the server but have not yet reached a certain maturity age or have not yet met one or more predefined conditions, may be sent back from the server to a multitude of clients for further evaluation. The evaluation result achieved by the clients (alternatively called herein as partial evaluation) for a gene is transferred back to the server. The server merges the partial evaluation results of a gene with that gene's fitness value at the time it was sent to the clients to arrive at a fitness measure for that gene. For example, assume that a gene is 500 evaluation days old and is sent from the server to, for example, two clients each instructed to evaluate the gene for 100 additional days. Accordingly, each client further evaluates the gene for the additional 100 stock-days and reports its evaluation results to the server. These two results are combined with the gene's fitness measure at the time it was sent to the two clients. The combined results represent the gene's fitness evaluated over 700 days. In other words, the distributed system, in accordance with this example, increases the maturity age of a gene from 500 days to 700 days using only 100 different evaluation days for each client. A distributed system, in accordance with the present invention, is thus highly scalable in evaluating its genes.

Advantageously, in accordance with the present invention, clients are enabled to use the genes stored in the server in their local reproductions, thereby improving the quality of their genes. Each client is a self-contained evolution device, not only evaluating the genes in its pool, but also creating a new generation of genes and moving the evolutionary process forward locally. Since the clients continue to advance with their own local evolutionary process, their processing power is not wasted even if they are not in constant communication with the server. Once communication is reestablished with the server, clients can send in their fittest genes to the server and receive genes from the server for further evaluation.

Each client computer has a communication port to access one or more data feed servers, generally shown using reference numeral 30, to obtain information required to solve the problem at hand. When recommending trading strategies for assets such as stocks, commodities, currencies, and the like, the information supplied by the data feed servers includes the asset values covering a specified time period. Alternatively, although not shown, the information required to solve the problem at hand may be supplied from a data feed server 30 to the clients 20 via server 10. Although server 10 is shown as a single central server in FIG. 1, it is understood that server 10 may be a distributed server.

Figure 2:
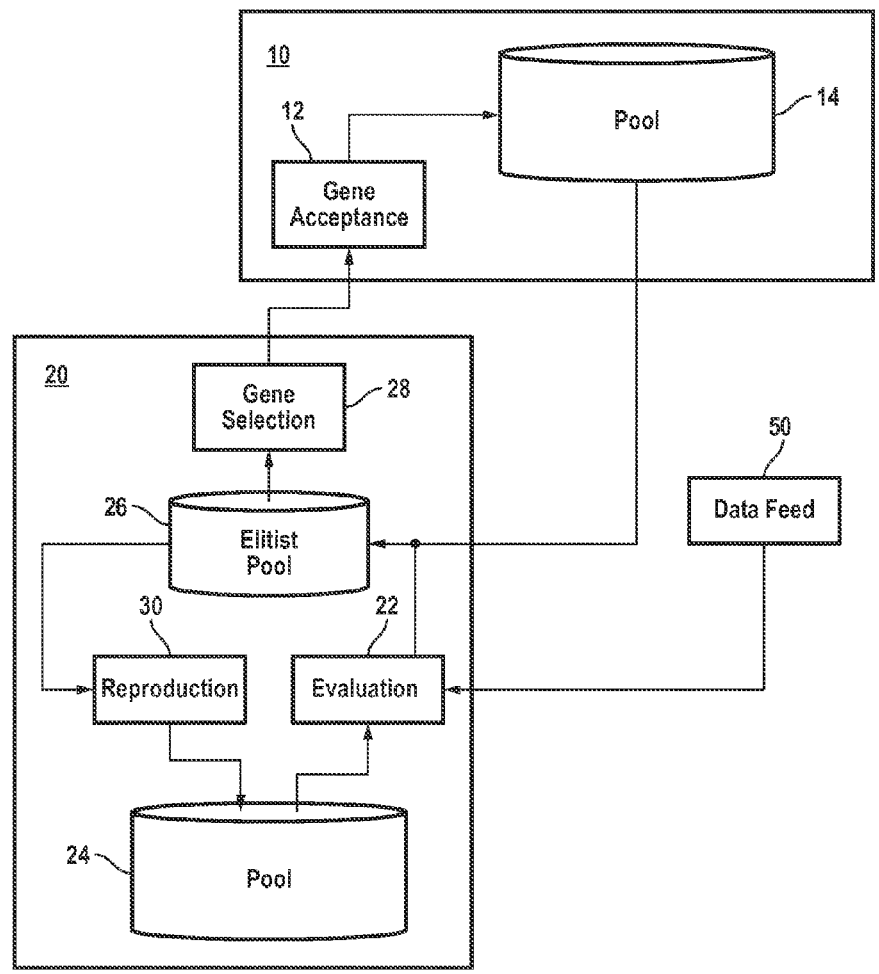
FIG. 2 shows a number of functional logic blocks of the client and server computer system of FIG. 1, in accordance with one exemplary embodiment of the present invention.

FIG. 2 shows a number of logic blocks of each client 20 and server 10. As is seen, each client 20 is shown as including a pool 24 of genes that are generated by a self-contained application software running on the client. In the following, each gene is assumed to be a trader of financial asset (e.g., stock), although it is understood that a gene may generally be suited to finding solutions to any other computational problem. The performance characteristics of each gene of a client is evaluated over a first predefined a time period, spanning P trading days, e.g. 600 days, using evaluation block 22. The evaluation for each gene is performed by comparing the trading recommendations of that gene and determining its corresponding rate of return over the predefined time period. The performance characteristic of a gene is alternatively referred to herein as the gene's fitness. Client 20 receives historical trading data to determine the fitness of its genes.

Upon completion of the performance evaluation of all its genes, each client computer selects and places its best performing genes (surviving genes) in elitist pool 26. In one embodiment, the surviving genes may be, e.g., the top 5% performers of the gene pool as determined by the rate of return of their recommendations. In other embodiments, the surviving genes are genes whose fitness exceeds a predefined threshold value. The remaining genes that fail to meet the required conditions for fitness do not survive and are discarded. Each client continues to evaluate its elitist (surviving) genes using the historical trading data that the client continues to receive on a periodic basis.

In some embodiments, following the initial evaluation of the genes over the first P trading days, the surviving genes are further evaluated for a multitude S of additional time periods each spanning Q other trading days. For example, following the initial evaluation of the genes during the first 600 trading days, each surviving gene is further evaluated over two additional time periods, each spanning 600 more trading days. Therefore, in such examples, each gene is evaluated for 1800 trading days. Such multitude of time periods may be non-overlapping consecutive time periods. Furthermore, the number of trading days, i.e. Q, of each additional time period may or may not be equal to the number of trading days, i.e. P, of the initial evaluation period. Evaluation in each such additional time period may result in discarding of genes that have survived previous evaluations. For example, a gene that may have survived the initial evaluation period of, e.g. 600 days, may not survive the evaluation carried out during the second time period of, e.g. 600 days, if its fitness during the trading days spanning the, e.g. 1200 days, is below a predefined threshold level. Genes stored in the elitist pool 26 that fail to survive such additional evaluation periods are discarded. The fitness threshold level that is required to pass the initial evaluation period may or may not be the same as the fitness threshold levels required to pass successive evaluations.

Genes that survive the fitness conditions of the initial and successive evaluation periods remain stored in elitist pool 26 and are made available to gene selection block 28 for possible selection and transmission to server 10, as shown in FIG. 2. Genes received by server 10 from client computers are stored in sever gene pool 14 of server 10. Gene selection block 28 compares the fitness of the genes in its associated elitist pool 26 with those of the worst performing genes stored in pool 14. In one embodiment, server 10 only accepts genes whose fitness, as determined by a client computer, is at least equal to or better than the fitness of the genes stored in gene pool 14. Server 10 thus informs the client computer about the fitness of its worst performing genes to enable the gene selection module 28 make this comparison and identify genes that server 10 will accept. For example, server 10 may send an inquiry to gene selection module 28 stating "the fitness of my worst gene is X, do you have better performing genes?" Gene selection module 28 may respond by saying "I have these 10 genes that are better" and attempt to send those genes to the server. In one embodiment, gene pool 14 has a fixed size. Therefore in order to accepting a new gene, server 10 discards one of the genes stored in its pool 14. In one embodiment, the initial population of pool 14 is formed from the fittest of all the genes initially stored in the clients' collective elitist pools. This process continues until pool 14 reaches its full capacity that may dynamically vary. In another embodiment, to form its initial gene population, pool 14 continues to accept genes stored in the elitist pools until pool 14 reaches its full capacity.

Gene acceptance block 12 is configured to ensure that a gene arriving from a client has a better fitness than the genes already stored in server pool 14 before that gene is added to server pool 358. Gene acceptance block 12 stamps each accepted gene with an ID, and performs a number of house cleaning operations prior to adding the accepted gene to server pool 14.

Genes in elitist pool 26 are allowed to reproduce. To achieve this, gene reproduction block 30 randomly selects and combines two or more genes, i.e., by mixing the rules used to create the parent genes. Pool 24 is subsequently repopulated with the newly created genes (children genes) as well as the genes that were in the elitist pool. The old gene pool is discarded. The new population of genes in pool 24 continue to be evaluated as described above.

In some embodiments, server 10 sends each genes stored in pool 14 whose maturity age (i.e., the sum of the trading days over which a gene's fitness has been evaluated) is less than a predefined value back to a group of selected client computers for more fitness evaluation over additional time periods spanning W trading days. Genes whose fitness as evaluated over the additional W trading days fail to satisfy one or more predefined conditions, e.g., their fitness is less than a required a threshold value, are discarded by the client computers. Genes whose fitness as evaluated over the additional W trading days satisfy the one or more predefined conditions are sent back to the server 10 for storage in pool 14. The discarded genes are reported to the server by the client computers.

In some embodiments, to increase the age a gene(s) stored in pool 14, server 10 sends the gene to a number of client computers each instructed to perform further evaluation of the gene over a different set of trading days. For example, assume four client computers are selected to further evaluate the fitness of a gene stored in pool 14. Accordingly, the first selected client computer is instructed to evaluate the gene over a first time period; the second selected client computer is instructed to evaluate the gene over a second time period; the third selected client computer is instructed to evaluate the gene over a third time period; and the fourth selected client computer is instructed to evaluate the gene over a fourth time period. It is understood that the first, second, third and fourth time periods are different time periods that may or may not overlap with one another. Thereafter, the server receives the fitness values from the selected client computers and combines these fitness results with the previous fitness value of the gene—as was maintained by the server prior to sending the gene back to the client—to arrive at an updated value for the gene's fitness value. Therefore, in accordance with the present invention, the speed at which the genes are aged is enhanced by distributing the evaluation task among a number of client computers operating in parallel. In one embodiment, the average of previous and new fitness values is used to compute a new fitness value for a gene that is sent to clients by the server for further evaluation. Since the genes in the server are sent to several clients for evaluation, only the results of partial evaluations of the genes are lost if one or more clients fail.

A backup/restore process for the server pool gene may be performed to ensure continuity in the event of the server failure. Moreover, because the clients are configured to have copies of the server genes they were instructed to evaluate and because the clients are self-sufficient in their evolutionary process, the clients can continue evaluating their gens and advance the evolutionary process even when the server fails or is otherwise off line. When the server is back on-line, the server pool can even be recreated from genes stored in sent the clients. Therefore, a network computing system, in accordance with embodiments of the present invention does not lose the history of the prior processing of the genes.

Data feed server 50 provides historical financial data for a broad range of traded assets, such as stocks, bonds, commodities, currencies, and their derivatives such as options, futures etc. Data feed server 50 may be interfaced directly with server 20 or clients. Data feed servers may also provide access to a range of technical analysis tools, such as financial indicators MACD, Bollinger Bands, ADX, RSI, and the like.

Figure 3A:
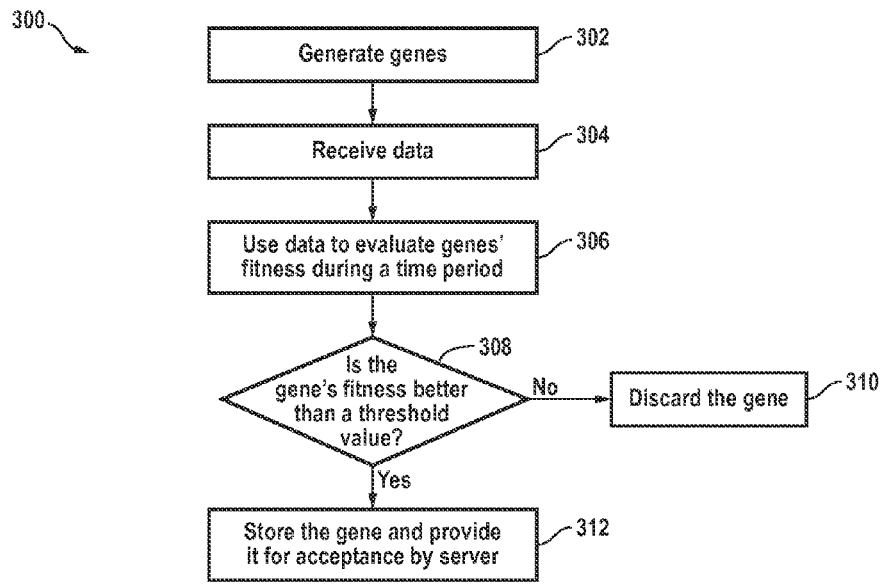
FIG. 3A shows an exemplary flowchart for evaluating performance characteristics of a number of genes by one or more client computers, in accordance with one embodiment of the present invention.

FIG. 3A shows an exemplary flowchart 300 for evaluating performance characteristics of a number of genes by a multitude of client computers, in accordance with one embodiment of the present invention. Following the generation 302 of genes and receipt 304 of data associated with the genes, the genes are evaluated 306 using the received data to determine their performance characteristics or fitness. Following the evaluations 306, genes whose fitness are determined 308 as being less than a threshold value, are discarded 310. Genes whose fitness are determined 308 as being greater than or equal to the threshold value are stored and provided 314 for selection and acceptance by a server computer.

Figure 3B:
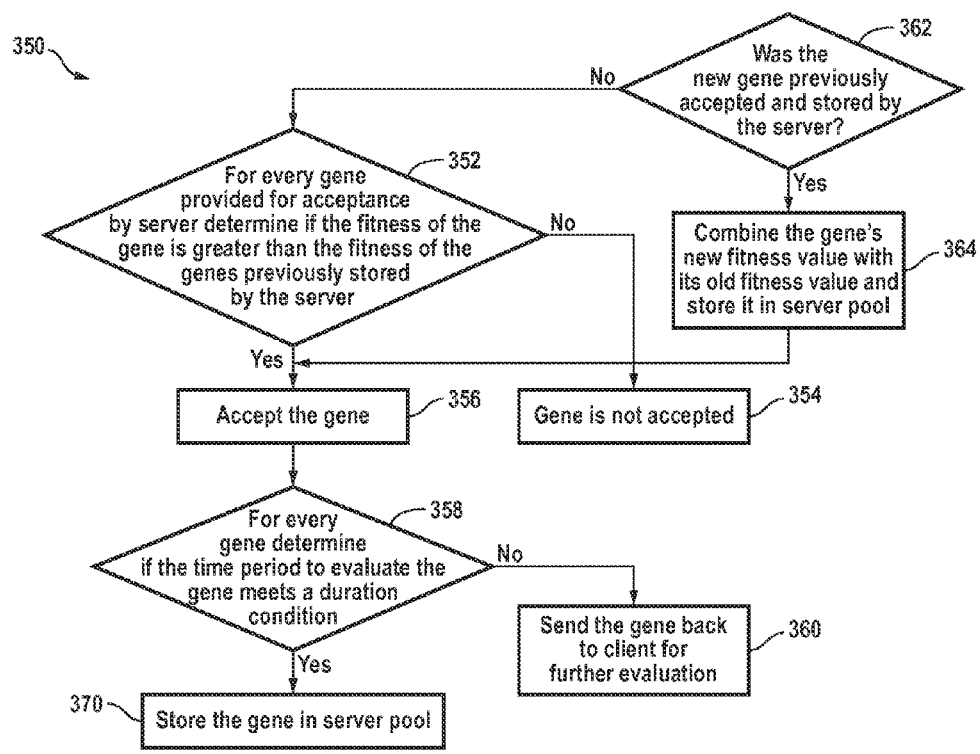
FIG. 3B shows an exemplary flowchart for evaluating performance characteristics of a number of genes by one or more server computers, in accordance with one embodiment of the present invention.

FIG. 3B shows an exemplary flowchart 350 for evaluating performance characteristics of a number of genes by one or more server computers, in accordance with one embodiment of the present invention. Prior to accepting a new gene, the server computer determines 362 whether the new gene was previously accepted and stored by the server. If the server computer determines that the new gene was previously accepted and stored by the server computer, the server computer combines 364 the fitness value of the new gene with its the old fitness value and accepts 356 the gene. If the server computer determines that the new gene was not previously accepted and stored by the server, the server computer compares 352 the fitness of each such gene to the fitness of the genes previously stored by the server computer. If this comparison 352 shows that the fitness of a gene provided for acceptance has a value that is greater than or equal to the fitness values of the genes previously stored by the server computer, the server computer accepts 356 the gene. If this comparison 352 shows that the fitness of a gene provided for acceptance has a value that is less than the fitness values of the genes previously stored by the server computer, the server computer does not accepts 354 the gene. For every gene accepted by the server computer, the server computer determines 358 whether the time period used to evaluate a newly accepted gene meets a required duration condition. If it is determined that a newly accepted gene does not meet the required duration condition, the gene is sent back 360 to one or more client computers for further evaluation covering more time periods. If it is determined that a newly accepted gene meets the required duration condition, the server computer stores 370 the newly accepted gene together with its fitness value.

Figure 4:
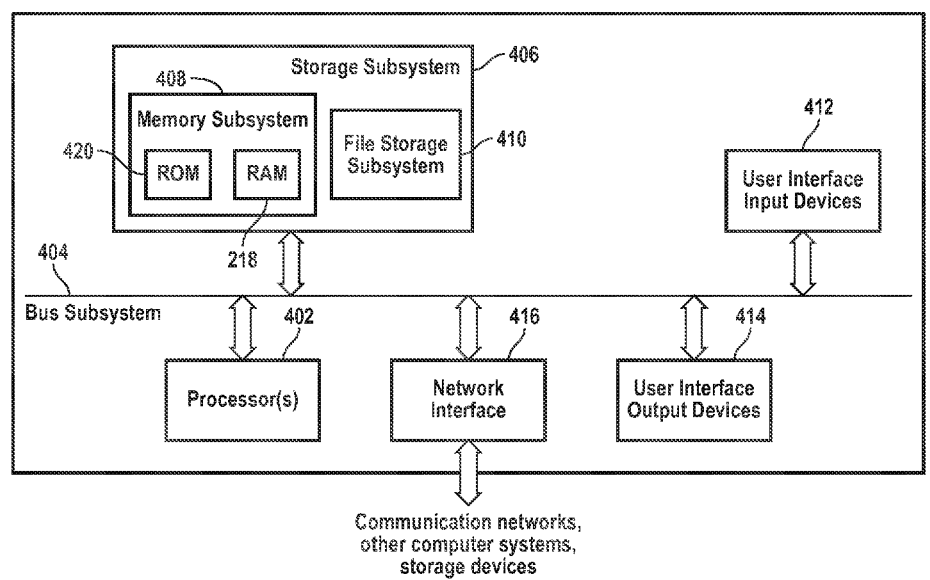
FIG. 4 shows a number of components of the client and server computers of FIG. 1, in accordance with one embodiment of the present invention.

FIG. 4 shows a number of components of the client and server computers of FIG. 1. Each server or client device is shown as including at least one processor 402, which communicates with a number of peripheral devices via a bus subsystem 404. These peripheral devices may include a storage subsystem 406, including, in part, a memory subsystem 408 and a file storage subsystem 410, user interface input devices 412, user interface output devices 414, and a network interface subsystem 416. The input and output devices allow user interaction with data processing system 402.

Network interface subsystem 416 provides an interface to other computer systems, networks, and storage resources 404. The networks may include the Internet, a local area network (LAN), a wide area network (WAN), a wireless network, an intranet, a private network, a public network, a switched network, or any other suitable communication network. Network interface subsystem 416 serves as an interface for receiving data from other sources and for transmitting data to other sources. Embodiments of network interface subsystem 416 include an Ethernet card, a modem (telephone, satellite, cable, ISDN, etc.), (asynchronous) digital subscriber line (DSL) units, and the like.

User interface input devices 412 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term input device is intended to include all possible types of devices and ways to input information to.

User interface output devices 414 may include a display subsystem, a printer, a fax machine, or non-visual displays such as audio output devices. The display subsystem may be a cathode ray tube (CRT), a flat-panel device such as a liquid crystal display (LCD), or a projection device. In general, use of the term output device is intended to include all possible types of devices and ways to output information.

Storage subsystem 406 may be configured to store the basic programming and data constructs that provide the functionality in accordance with embodiments of the present invention. For example, according to one embodiment of the present invention, software modules implementing the functionality of the present invention may be stored in storage subsystem 206. These software modules may be executed by processor(s) 402. Storage subsystem 406 may also provide a repository for storing data used in accordance with the present invention. Storage subsystem 406 may include, for example, memory subsystem 408 and file/disk storage subsystem 410.

Memory subsystem 408 may include a number of memories including a main random access memory (RAM) 418 for storage of instructions and data during program execution and a read only memory (ROM) 420 in which fixed instructions are stored. File storage subsystem 410 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Bus subsystem 404 provides a mechanism for enabling the various components and subsystems of the client/server to communicate with each other. Although bus subsystem 404 is shown schematically as a single bus, alternative embodiments of the bus subsystem may utilize multiple busses.

The client/server may be of varying types including a personal computer, a portable computer, a workstation, a network computer, a mainframe, a kiosk, or any other data processing system. It is understood that the description of the client/server depicted in FIG. 3 is intended only as one example Many other configurations having more or fewer components than the system shown in FIG. 3 are possible.

The above embodiments of the present invention are illustrative and not limiting. The present invention is not limited by the type or number of client computers that may be used. The present invention is not limited by the type or number of server computers that may be used. server Various alternatives and equivalents are possible. Other additions, subtractions or modifications are obvious in view of the present disclosure and are intended to fall within the scope of the appended claims.

What is claimed is:

1. A computer-implemented data mining system, comprising:
   a data processor; and
   a memory accessible to the data processor and identifying a candidate database having a pool of individuals, each of the individuals further having associated therewith an indication of a respective fitness estimate,
   for use with a data mining training database accessible to the data processor and identifying training data,
   the data processor configured to:
   test on a first subset of the training data each individual in a testing subset of at least one of the individuals;
   calculate a fitness estimate for each of the individuals in the testing subset in dependence upon the tests on the first subset of the training data;
   discard individuals from the pool of individuals in dependence upon their fitness estimates;
   test on a second subset of the training data, each individual in the testing subset which remains after the discarding of individuals, the second subset including at least one datum not included in the first subset;
   update, in dependence upon the tests on the second subset of the training data, the fitness estimate for each individual tested on the second subset of the training data; and
   discard further individuals from the pool of individuals in dependence upon their updated fitness estimates.

2. A system according to claim 1, wherein the first subset of the training data also includes at least one datum not included in the second subset of the training data.

3. A system according to claim 1, wherein each individual in the pool identifies a respective set of at least one condition and at least one corresponding proposed output in dependence upon the conditions.

4. A system according to claim 3 wherein the training database contains historical market data for one or more financial assets,
   wherein each individual indicates a plurality of conditions resolvable in dependence upon the market data in the training database, the outputs identified by the individuals including trading instructions for one or more of the financial assets,
   and wherein the data processor is further configured to provide, for use in generating trading recommendations in dependence upon production data, individuals from the pool of individuals not discarded from the pool in dependence upon their updated fitness estimates.

5. A system according to claim 1, wherein the data processor is further configured to transmit to a server computer system individuals remaining after the discarding of further individuals from the pool of individuals in dependence upon their updated fitness estimates.

6. A system according to claim 5, further comprising the server computer system, wherein the server computer system comprises:
   a server data processor; and
   a memory accessible to the data processor, the server data processor configured to transmit selected received individuals to a client computer system for further testing on the training data.

7. A system according to claim 6, wherein the server data processor is further configured to discard selected received individuals in dependence upon their fitness estimates.

8. A system according to claim 1, wherein the data processor includes first and second computer systems,
   wherein the first computer system is configured to perform the testing on the first subset of the training data and the second computer system is configured to perform the discarding of individuals in dependence upon their fitness estimates.

9. A system according to claim 1, wherein the data processor is further configured to produce new individuals by reproduction in dependence upon one or more individuals remaining after the discarding of further individuals.

10. A system according to claim 1, wherein the discarding of individuals from the pool of individuals in dependence upon their fitness estimates, operates further in dependence upon the quantity of testing that has been experienced by the individuals.

* * * * *